Dec. 30, 1969     E. SAWICKI     3,486,237
POSITIONING TOOL FOR VACUUM CHAMBER WORKHOLDER
Filed Sept. 29, 1967     3 Sheets-Sheet 2

EDWARD SAWICKI
INVENTOR.

BY Frank C. Parker

ATTORNEY

EDWARD SAWICKI
INVENTOR.

BY Frank C. Parker

ATTORNEY

# United States Patent Office 3,486,237
Patented Dec. 30, 1969

1

3,486,237
POSITIONING TOOL FOR VACUUM CHAMBER
WORKHOLDER
Edward Sawicki, Irondequoit, N.Y., assignor to Bausch
& Lomb Incorporated, Rochester, N.Y., a corporation
of New York
Filed Sept. 29, 1967, Ser. No. 671,819
Int. Cl. G01b 5/24, 5/14
U.S. Cl. 33—180                                5 Claims

ABSTRACT OF THE DISCLOSURE

A positioning tool for a vacuum coating chamber workholder which efficiently and readily establishes radial alignment of the workholder with respect to the axis of planetary motion thereof, disposes the workholder at a predetermined required angle, and linearly locates the workholder with respect to a source of coating material.

BACKGROUND OF THE INVENTION

This invention relates to an improved positioning tool for establishing the exact location of a workholder in a vacuum coating apparatus.

For many years, glass lenses have been coated by vacuum depositing a material on the surface of the lens for, among other things, light reflecting properties. One such apparatus for vacuum coating lenses is disclosed in U.S. Patent No. 2,351,537, granted to H. Osterberg et al., June 13, 1944. The Osterberg et al. patent shows the basic requirements for a vacuum coating system, namely a source of material to be evaporated and an adjustable support to support the piece to be coated. The support can be adjusted through an infinite series of angular dispositions by means of the angular adjusting device and the distance from the coating source can be set by moving the vertical support up and down or side to side. In general, vacuum coaters have become a great deal more sophisticated than that disclosed in the Osterberg et al., patent. However, in spite of the improvements in the mechanical aspects of vacuum coating apparatus to date, the same basic considerations are involved, namely, the angular and linear distance between the source and the piece to be coated. The angular disposition and the distance of the piece to be coated from the source will determine the properties of the film being coated onto the optical surface. For example, in the case of providing an anti-reflection coating on a lens surface, the thickness of the coating will determine the anti-reflection properties of the coating as well as the ability of the coating to transmit light. This requirement for control of positioning becomes even more critical where a multi-layer coating is to be applied to the surface of the workpiece.

Today the method of positioning the workpiece holder has been either by a method of trial and error wherein the coatings are applied and then evaluated to determine the positions, or measuring the position of the workpiece holder from a fixed reference point using a ruler, protractor and level. Such methods as heretofore described are at best time consuming and expensive.

A further problem arises when it becomes necessary to monitor the position of the workpiece holder after successive runs of similar coatings. This problem exists because most workpiece holders are rotated about a central axis and are, themselves, in a planetary motion around the source of coating material. Due to the fact that these workpiece holders are enclosed in a vacuum chamber they cannot be lubricated because any lubricants would introduce impuities into the evacuated chamber. Therefore, since the workpiece holders are rotated without lubrication they are subject to excessive wear. The wear in turn causes a movement of position from the original parameters established for the coating. Therefore, after each successive run, the workpiece holder must be repositioned to the desired parameters, which in turn is a long process.

Furthermore, when establishing coating parameters initially, it is extremely difficult to obtain the desired position measurements of the workpiece holder after the proper coating has been established. If, as in the case of establishing coatings by trial and error, the precise position of the workpiece holder cannot be measured, such a coating cannot be reproduced readily on successive sample runs.

SUMMARY OF THE INVENTION

To alleviate the above described problems and to, in general, provide a more simplified control over the position of the vacuum chamber workpiece holder, I have deviced a new tool for positioning the vacuum coater workpiece holder. The tool comprises means for aligning the center of the workholder with the axis of the planetary motion of the workpiece holder, means for disposing the workpiece holder at the required angle, and means for accurately setting the distance from the workpiece holder to the source of coating material. Using this new tool, it becomes very easy to accurately and reproducibly position the vacuum chamber workpiece holder to any desired position.

In view of the above summary it is a primary object of this invention to provide a new tool for positioning a workpiece holder in relation to a fixed center line of a machine and at a fixed distance and fixed angular disposition to a point on said center line.

It is a further object of this invention to provide a new tool for positioning a vacuum coating chamber workpiece holder so as to accurately position said workpiece holder for successive runs.

It is a still further object of this invention to provide a new tool for positioning a vacuum chamber workpiece holder in a fast and accurate manner.

It is another object of this invention to provide an improved method of positioning the workpiece holder in a vacuum coating chamber using a unitary positioning tool.

DESCRIPTION OF THE PREFERRED EMBODIMENT

Figure 1:
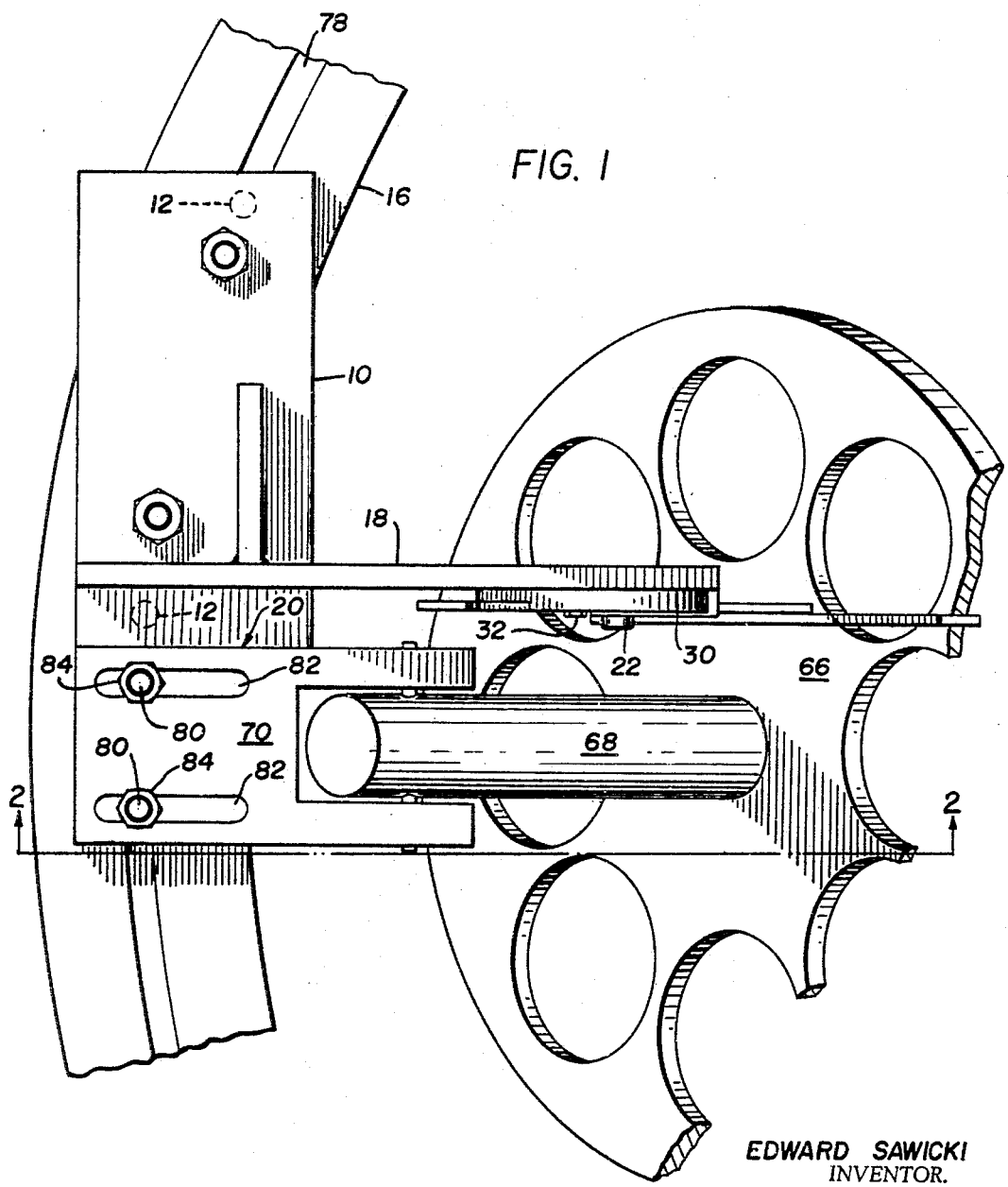
FIGURE 1 is a top view, showing the apparatus of the invention in conjunction with the workpiece holder.

The device of the present invention comprises a base 10 of generally rectangular configuration as shown in FIGURE 1. Depending from the bottom of the base are stud locating means 12 shown in ghost outline in FIGURE 1. The base is also provided with apertures 14 for receiving a bolt or similar device to fixedly attach the base 10 to the workpiece holder mounting device shown as 16 in FIGURE 1 and FIGURE 2. Fixedly attached to the base 10 is cross arm 18 normal to base 10 and parallel to edge 20 of base 10. The cross arm 18 extends outwardly from the base 10 and has at the outward extending end a pivot 22. A protractor 24 is mounted with its central axis on the pivot 22 for rotation about the pivot. The protractor 24 contains a straight bottom portion shown as edge 26. Protractor 24 is also provided with a curved groove 28, the curve of the groove being concentric with the curved periphery 30 of the protractor. The groove 28 is slidably mounted over a stud 32 fixedly attached to the cross arm 18. The stud 32 is provided with threads and a nut or other suitable locking means 34 for holding the protractor rigidly in various positions. The protractor is further provided with a stud 36 mounted below the pivotal means 22 but in axial alignment therewith. Slidably mounted on the stud 36 is a straight edge 38. The straight edge 38 is provided with a slot 40 parallel to edge 42 of the straight edge 38. The straight edge is mounted on the stud 36 through the slot with the edge 42 parallel to edge 26 of the protractor. Locking means such as a nut 44 is provided on the end of stud 36 to secure the straight edge to the protractor. Mounted normal to the straight edge 38 is a second straight edge 46 with parallel edges 48, 50 forming a T-square like device.

The circumferential edge 30 of the protractor 24 is provided with graduations in degrees of arc. Scribed on the leading edge 54 of cross arm 18 is a reference mark 56, parallel to the bottom of base 10, for determining the horizontal position of the cross arm and the zero reference point for the protractor. Edge 42 of straight edge 38 is provided with graduations in inches or fractions of an inch measured from the edge 50 to the top of the straight edge 38.

Figure 3:
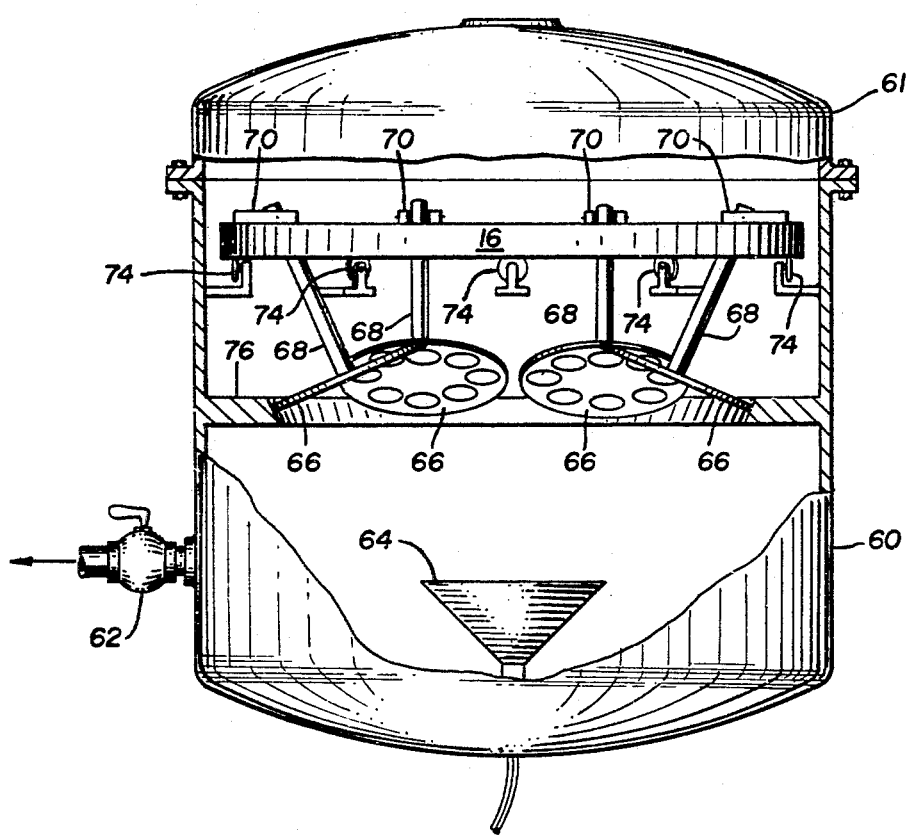
FIGURE 3 is a plan view partially in section showing a vacuum coating apparatus to which the invention is applicable.

Shown in FIGURE 3 is a vacuum coating device of the type wherein the device of the instant invention may be used. The vacuum chamber consists essentially of a lower chamber 60, an upper chamber 61, an evacuating port 62 and an evaporating means 64. Mounted within the vacuum chamber is an annular ring 16 adaptable to carry a plurality of workpiece holders designated as 66 by means of shafts 68 and shaft supports 70. The annular ring 16 is rotatable within the vacuum chamber about an axis normal to and through the center of the evaporating device 64. The ring 16 can be mounted in a variety of fashions. In this figure it is shown as riding on wheel means 74 spaced about the inner periphery of the vacuum chamber 60. Rotational motion is imparted to the sample holding means 66 as by having the periphery of the wheel 66 frictionally engaged to an annular ring 76 disposed within the lower portion of the vacuum chamber. The driving means for the annular ring 16 and the driving means for providing rotational motion to the sample holding devices 66 do not form any part of this invention. They are merely included to show the method of using the device of the instant invention.

Figure 2:
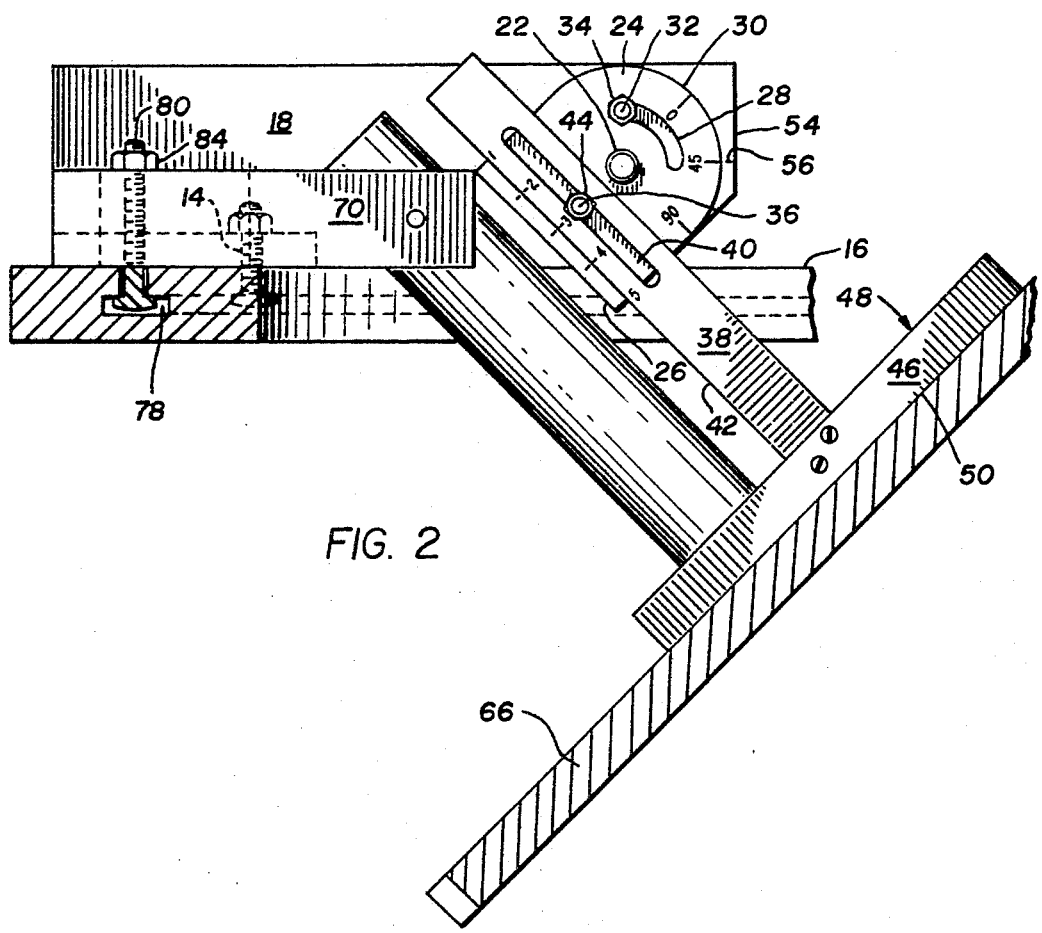
FIGURE 2 is a view taken along section 2—2 of FIGURE 1.

Referring now to FIGURES 1 and 2, it will be seen that the annular ring 16 is provided with a central aperture 78 in the form of a T slot. Slidably mounted within the T slot are a plurality of bolts designated as 80. The bolts 80 project upwardly from the slot and are adaptable to engage slots 82 in the workpiece holding device 70. The bolts 80 are threaded to receive suitable holding means such as nuts 84. The workpiece holder fastening device 70 is then fixedly attached to the rail 16 by means of bolts 80 and nuts 84. Because of the slots 82 it is possible to adjust the position of the workpiece holder mounting device 70 inwardly of the ring toward or away from the vertical center lines of the vacuum chamber and the evaporating fixture. When the work holding device is in position the device of the instant invention is placed upon the rail 16 with the downward projecting studs 12 located within the slot 78. The studs 12 are positioned on the underside of the base 10 so as to conform to the curvature of the slot 78, and radially align edge 20 of base 10 with the vertical center line through the evaporating fixture 64. Studs or bolts slidably mounted in the rail then can be projected through openings 14 in the base 10 to rigidly attach the base 10 to the rail 16. Alternatively, other devices, such as clamps, could be used to rigidly attach the base 10 to the rails 16. Edge 20 of base 10 is butted against the side of the holding fixture 70 thereby providing axial alignment of the holding fixture with the vertical center line of the evaporating fixture. At this time, nuts 34 and 44 are loosened and the angular and linear positions of the protractor and straight edge, respectively, are set according to predetermined calculation. The workpiece holder 66 may then be both angularly and linearly disposed from the source of evaporation by merely tightening nuts 34 and 44.

Conversely, if the position of the workpiece holder 66 has been established for a particular coating on an experimental basis then it becomes a matter of reversing the above process in order to record the parameters used for the particular coating. Using the tool of the instant invention to set the specimen holding device 66 to the desired position in the vacuum coater, future runs of the same type, using the same substrate material, can be easily accomplished.

Although I have, in relation to the specific embodiment, referred to stud means for locating the base 10 and bolt means for fixedly attaching the base 10 to the rail 16, it is obvious that other devices may be used to accomplish positioning of the base.

From the foregoing it is evident that I have provided an improved device for positioning the workpiece holder in axial alignment and at a predetermined distance and predetermined angular disposition from a fixed reference point in a vacuum chamber.

I have also provided an improved method for maintaining a set position and/or determining a particular position of a workpiece holder in a vacuum chamber.

Although only certain forms of the present invention are shown and described herein in detail other forms are possible and changes may be made.

I claim:

1. An instrument for positioning a workpiece holder in radial alignment with the vertical axis of and at a predetermined distance from and predetermined angular disposition to a fixed reference plane having a fixed reference point comprising:

a base plate with at least one straight edge, means for aligning said straight edge in axial alignment with and normal to a vertical line passing through said fixed reference point, means for holding said base plate in fixed alignment with said fixed reference point, a cross arm fixedly attached to said base plate in parallel alignment with the radially aligned base plate edge and extending outward of said base plate, pivotal mounting means disposed on the outward extending portion of the cross arm, a protractor mounted on said pivotal mounting means for rotation thereabout, locking means for securing said protractor at a predetermined position during rotation of said pivotal mounting means, distance measuring means slidably attached to said protractor in parallel relation with said protractor base, locking means for securing said measuring means at a predetermined position, first marking means on said protractor for indicating angular disposition thereof with respect to its axis of rotation about said pivotal mounting means, and second marking means on said distance measuring means for indicating the distace thereof from said fixed reference plane.

2. A device according to claim 1 wherein said distance measuring means comprises a T-square.

3. An instrument for positioning a workpiece holder in radial alignment with the vertical axis of and at a predetermined distance from and predetermined angular disposition to a fixed reference plane having a fixed reference point in a vacuum coating apparatus comprising:

a base plate with at least one straight edge, means for aligning said straight edge in axial alignment with and normal to a vertical line passing through said fixed reference point, said means comprising downwardly depending studs on said base.

means for holding said base in fixed alignment with said fixed reference point, a cross arm fixedly attached to said base plate in parallel alignment with the radially aligned base plate edge and extending outward of said base plate, pivotal mounting means disposed on the outward extending portion of the cross arm, a protractor mounted on said pivotal mounting means for rotation about said means, locking means for securing said protractor at a predetermined position during rotation of said pivotal mounting means, distance measuring means slidably attached to said protractor and in parallel relation with said protractor base, locking means for securing said measuring means at a predetermined position, first marking means on said protractor for indicating angular disposition thereof with respect to its axis of rotation about said pivotal mounting means, and second marking means on said distance measuring means for indicating the distance thereof from said fixed reference plane.

4. An instrument for positioning a workpiece holder in radial alignment with the vertical axis of and at predetermined distance from and predetermined angular disposition to the evaporation source in a vacuum coating apparatus comprising:

a base plate with at least one straight edge, means for aligning said straight edge in axial alignment with the vertical axis of a fixed reference line, clamping means for holding said base in fixed alignment with said fixed reference line, a cross arm fixedly attached to said base plate in parallel alignment with the axially aligned base plate edge and etxending outward of said base plate, pivotal mounting means disposed on the outward extending portion of the cross arm, a protractor mounted on said pivotal mounting means for rotation about said means, locking means for securing said protractor at a predetermined position during rotation of said pivotal mounting means, distance measuring means slidably attached to said protractor in parallel relation with said protractor base, locking means for securing said measuring means at a predetermined position, first marking means on said protractor for indicating angular disposition thereof with respect to its axis of rotation about said pivotal mounting means, and second marking means on said distance measuring means for indicating the distance thereof from said fixed reference plane.

5. A method for positioning a workpiece holder in radial alignment with the vertical axis of and at a predetermined distance and angular disposition to an evaporation source of a vacuum coating apparatus comprising:

providing a base plate with at least one straight edge, aligning said straight edge in axial alignment with and normal to the axis of said evaporating source, fixedly holding said base plate in fixed alignment with said evaporation source, providing a cross arm fixedly attached to said base plate in parallel alignment with the aligned base plate edge and extending outward of said plate, pivotally mounting a graduated protractor on the outward extending portion of the cross arm, slidably mounting a graduated straight edge on said protractor, setting the protractor and graduated straight edge to the desired angle and distance, respectively, and thereafter bringing the workpiece holder in contact with the depending end of the graduated straight edge.

References Cited

UNITED STATES PATENTS

| | | | |
|---|---|---|---|
| 2,351,537 | 6/1944 | Osterberg et al. | 118—49 |
| 3,128,205 | 4/1964 | Illsley | 118—49 |
| 3,336,898 | 8/1967 | Simmons et al. | 118—49 |

WILLIAM D. MARTIN, JR., Primary Examiner

U.S. Cl. X.R.

33—75; 118—49, 500